(12) United States Patent
Arthur et al.

(10) Patent No.: US 7,198,474 B2
(45) Date of Patent: Apr. 3, 2007

(54) PUMP HAVING SHAPE MEMORY ACTUATOR AND FUEL CELL SYSTEM INCLUDING THE SAME

(75) Inventors: Alan R Arthur, Salem, OR (US); Gary J. Watts, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 10/410,620

(22) Filed: Apr. 7, 2003

(65) Prior Publication Data

US 2004/0197214 A1 Oct. 7, 2004

(51) Int. Cl.
- F01B 19/00 (2006.01)
- F04B 23/08 (2006.01)
- F04B 17/00 (2006.01)
- F04B 35/04 (2006.01)
- F01L 31/00 (2006.01)

(52) U.S. Cl. .................. 417/534; 417/413.1; 417/321; 417/328; 417/410.1; 417/474; 92/48; 91/348

(58) Field of Classification Search .............. 417/328, 417/410.1, 534, 321, 89, 74, 89.16; 92/48, 92/98 R; 91/348
See application file for complete search history.

(56) References Cited

U.S. PATENT DOCUMENTS

| | | | |
|---|---|---|---|
| 4,018,547 A | | 4/1977 | Rogen |
| 4,247,264 A | * | 1/1981 | Wilden ................. 417/393 |
| 4,416,588 A | * | 11/1983 | Karliner ............... 417/199.1 |
| 4,761,955 A | * | 8/1988 | Bloch ..................... 60/528 |
| 4,818,191 A | * | 4/1989 | Schlake ................. 417/390 |
| 5,435,152 A | | 7/1995 | McCausland |
| 5,575,790 A | | 11/1996 | Chen et al. |
| 5,622,482 A | | 4/1997 | Lee |
| 5,659,171 A | | 8/1997 | Young et al. |
| 5,725,358 A | * | 3/1998 | Bert et al. ............. 417/44.2 |
| 5,919,167 A | | 7/1999 | Mulhauser et al. |
| 6,024,067 A | * | 2/2000 | Takachi et al. ........ 123/197.1 |
| 6,455,183 B1 | * | 9/2002 | Reiser et al. ............ 429/34 |
| 6,659,980 B2 | * | 12/2003 | Moberg et al. .......... 604/154 |
| 6,916,159 B2 | * | 7/2005 | Rush et al. ............. 417/321 |

FOREIGN PATENT DOCUMENTS

| | | |
|---|---|---|
| FR | 2 663 085 | 12/1991 |
| JP | 09-259912 | 10/1997 |
| WO | WO 02/057627 A1 | 7/2002 |

OTHER PUBLICATIONS

EPO Search Report dated Feb. 8, 2006 for EPO application Ser. No. 04251627.

* cited by examiner

*Primary Examiner*—Ehud Gartenberg
*Assistant Examiner*—Ryan Gillan

(57) ABSTRACT

A pump having a linearly movable shaft, a rotatable hub operably connected to the shaft, and shape memory actuator operably connected to the rotatable hub, and a fuel cell system including the same.

15 Claims, 7 Drawing Sheets

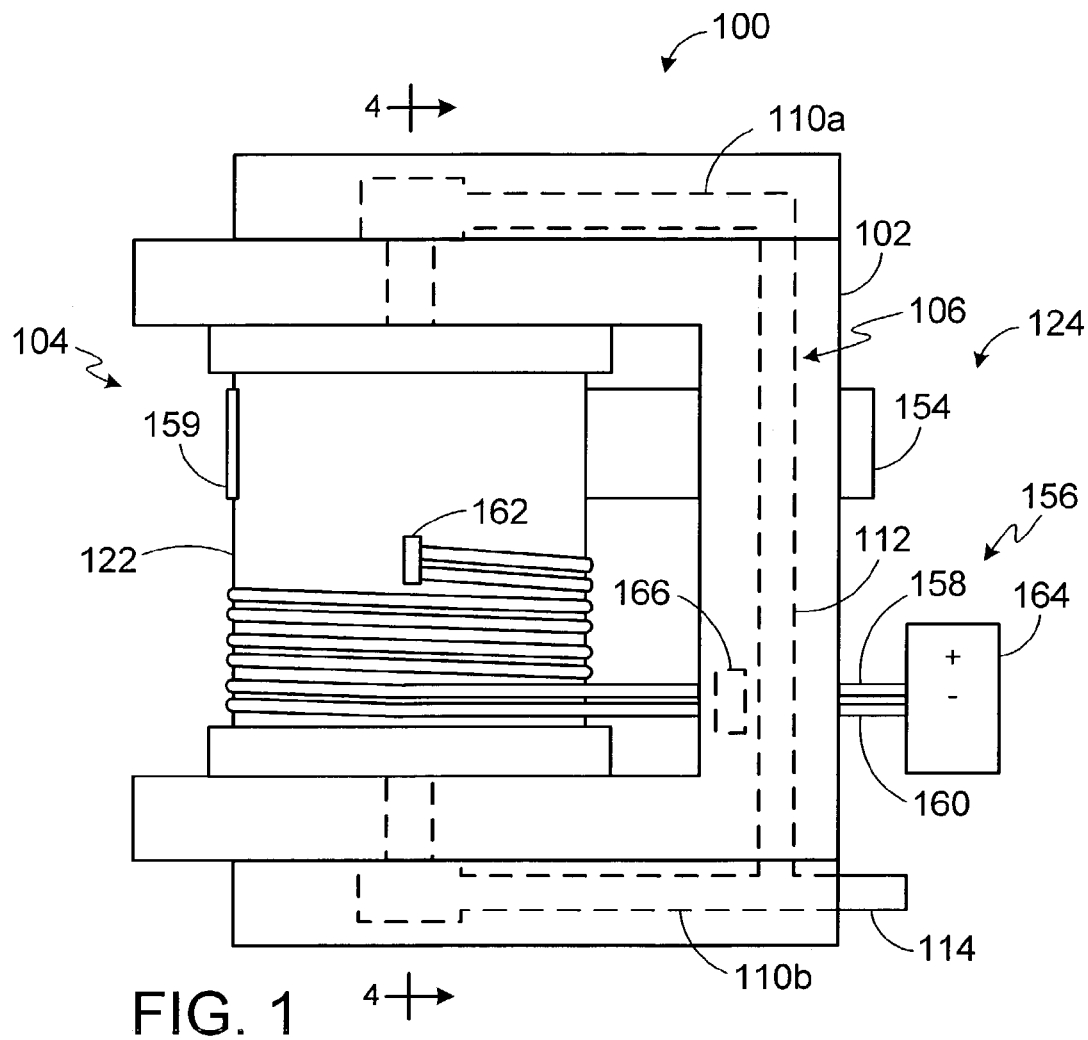
FIG. 1
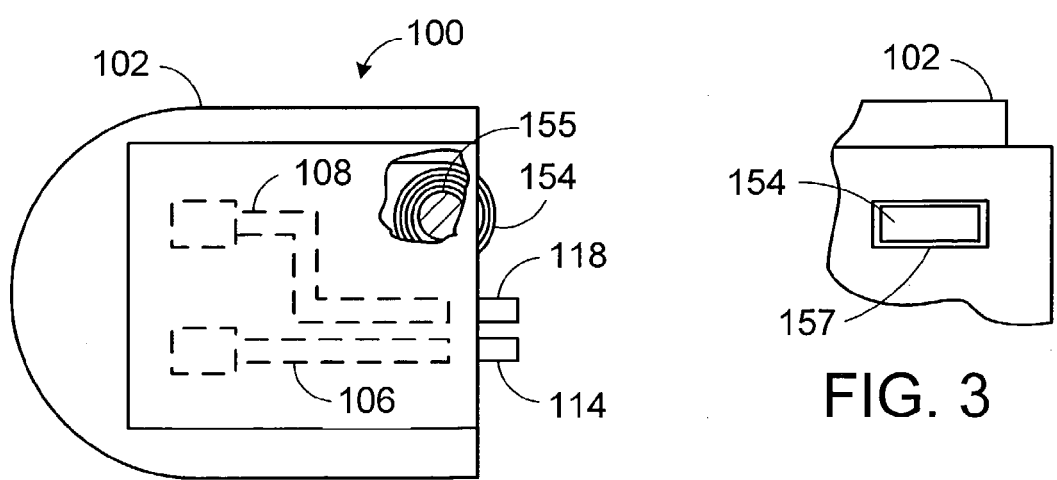
FIG. 2
FIG. 3

PUMP HAVING SHAPE MEMORY ACTUATOR AND FUEL CELL SYSTEM INCLUDING THE SAME

BACKGROUND OF THE INVENTIONS

1. Field of the Invention

The present inventions are related to pumps.

2. Description of the Related Art

Pumps are used to drive fluids to and within a wide variety of devices. In those instances where the associated devices are relatively small, such as in certain fuel cell applications, miniaturized pumps are frequently called upon to produce relatively high flow rates despite relatively high head losses. With respect to the pumping air and other gasses, conventional axial fans are relatively small, but suffer from relatively low static pressure efficiency and, accordingly, are not suitable for high head loss applications. Conventional diaphragm pumps, which are motor, piezo or electrostatically driven, deliver better static pressure efficiency, but are typically relatively large.

BRIEF DESCRIPTION OF THE DRAWINGS

Detailed description of preferred embodiments of the inventions will be made with reference to the accompanying drawings.

FIG. 1 is a side view of a pump in accordance with a preferred embodiment of a present invention.

FIG. 2 is a top view of the pump illustrated in FIG. 1.

FIG. 3 is a partial rear view of the pump illustrated in FIG. 1.

DETAILED DESCRIPTION OF THE PREFERRED EMBODIMENTS

Figure 4:
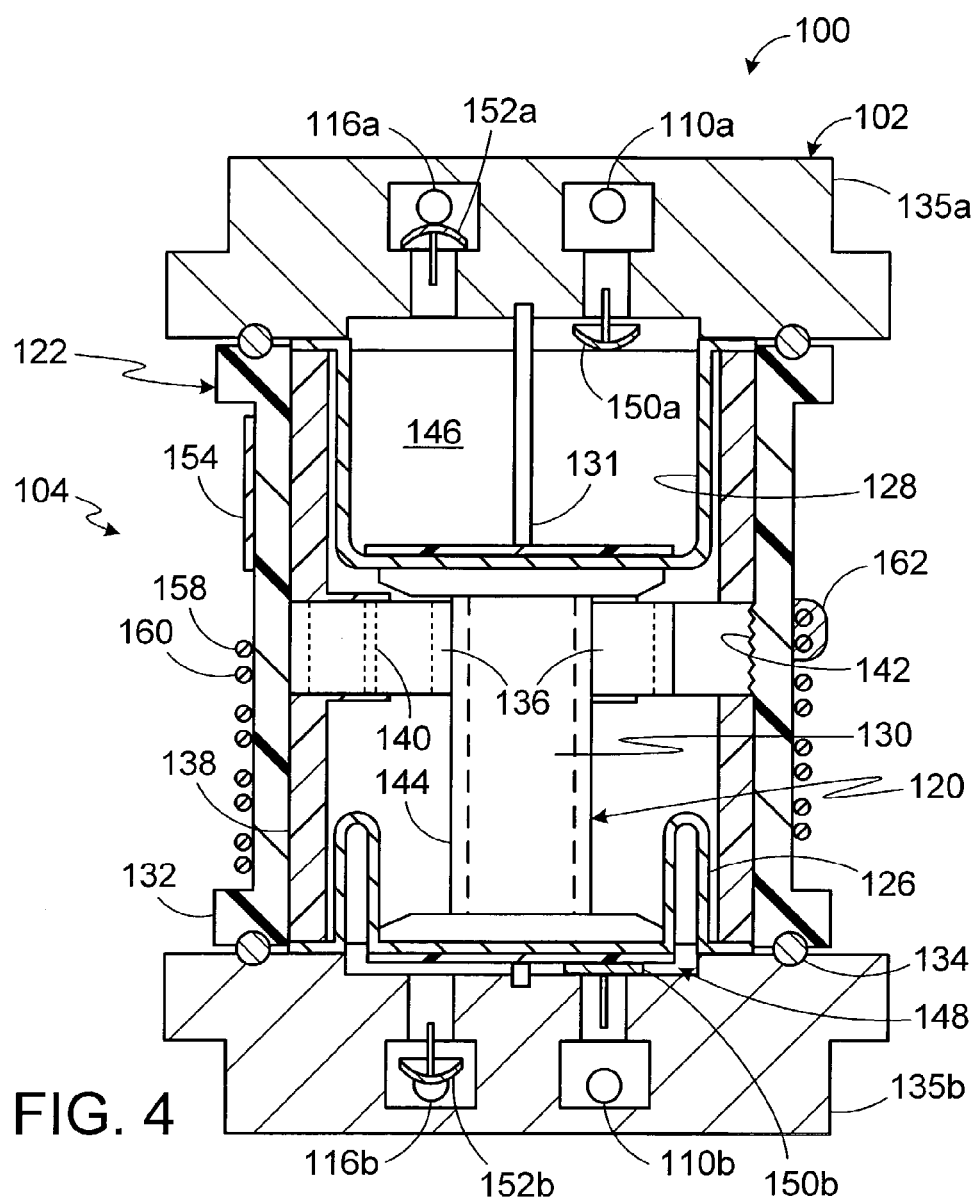
FIG. 4 is a section view taken along line 4—4 in FIG. 1 with the pump in a down-stroke orientation.

The following is a detailed description of the best presently known modes of carrying out the inventions. This description is not to be taken in a limiting sense, but is made merely for the purpose of illustrating the general principles of the inventions.

As illustrated for example in FIGS. 1–3, a pump 100 in accordance with one embodiment of a present invention includes a frame 102 and a fluid drive assembly 104. The fluid drive assembly 104 receives fluid (i.e. liquid or gas) by way of an inlet manifold 106 in the frame 102 and expels fluid through an outlet manifold 108 which is also located within the frame. The exemplary fluid drive assembly 104 receives fluid at both of its longitudinal ends, expels fluid at both of its longitudinal ends and, more specifically, receives fluid at one longitudinal end while expelling fluid from the other. To that end, the inlet manifold 106 includes top and bottom portions 110a and 110b and a connector portion 112. An inlet port 114 is connected to the inlet manifold 106. The outlet manifold 108, which includes top and bottom portions 116a and 116b (FIG. 4) and a connector portion (not shown), is connected to an outlet port 118.

Figure 5:
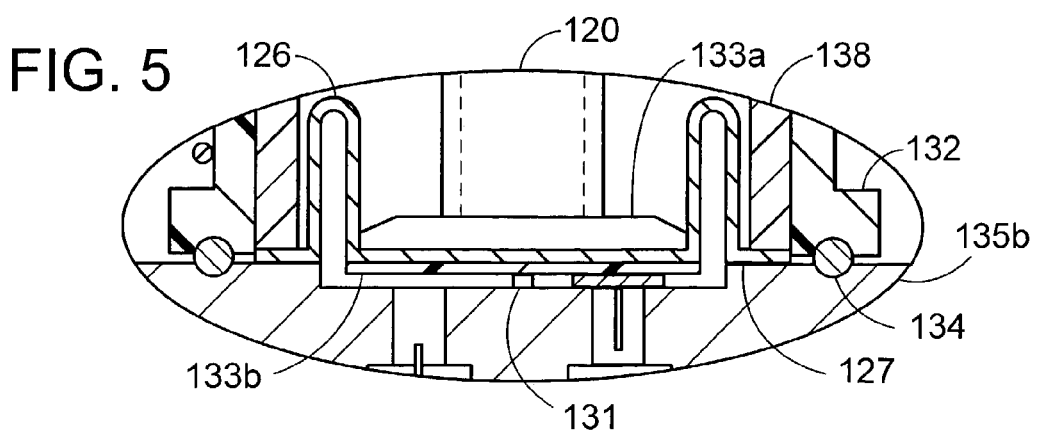
FIG. 5 is an enlarged view of a portion of the section view illustrated in FIG. 4.

Turning to FIGS. 4 and 5, the fluid drive assembly 104 in the exemplary pump 100 includes a linearly (or "axially") movable structure 120 that imparts motion to fluid, a rotatable structure 122 that drives the linearly movable structure to move axially, and an actuator 124 (FIG. 1). The exemplary linearly movable structure 120 is provided with a pair of rolling diaphragms 126 and 128 mounted on opposing ends of a drive shaft 130. The drive shaft 130 is slidably mounted on axle 131. The diaphragms 126 and 128, which are each sandwiched between a pair of plates 133a and 133b (FIG. 5), are formed from a flexible material such as neoprene or other similar materials and will deflect between orientations illustrated in FIGS. 4 and 6 as the drive shaft 130 moves linearly. The exemplary rotatable structure 122 includes a drive hub 132, which is carried by an upper and lower series of bearings 134 between the upper and lower portions 135a and 135b of the frame 102. This arrangement allows the drive hub 132 to rotate relative to the frame 102, but does not allow the drive hub to move axially. The exemplary bearings 134 are preferably ball bearings and are located within semi-circular channels that are formed in the frame upper and lower portions 135a and 135b and the drive hub 132. Other bearings arrangements, such as self contained angular contact bearings, may also be employed.

The linearly movable structure 120 and rotatable structure 122 may be connected to one another in any suitable manner that results in linear movement of the drive shaft 130 in response to rotation of the drive hub 132. In the exemplary pump 100, the connection is mechanical and consists of a planetary gear arrangement. More specifically, and referring to FIG. 4, three equally spaced planetary gears 136 (only two of which are visible) are rotatably mounted on a fixedly positioned gear frame 138 with axles 140. Thus, although the planetary gears are free to rotate about the axles 140, their position relative to the frame 102 is fixed. The portion of the inner surface of the drive hub 132 that is aligned with the planetary gears 136 has a gear surface 142 which allows the drive hub to act as a ring gear. The drive shaft 130, on the other hand, acts as a rotationally fixed sun gear having an outer gear surface 144. So arranged, rotation of the drive hub 132 around the fixed gear frame 138 will result in rotation of the planetary gears 136 which, in turn, will result in linear movement of the drive shaft 130.

Figure 6:
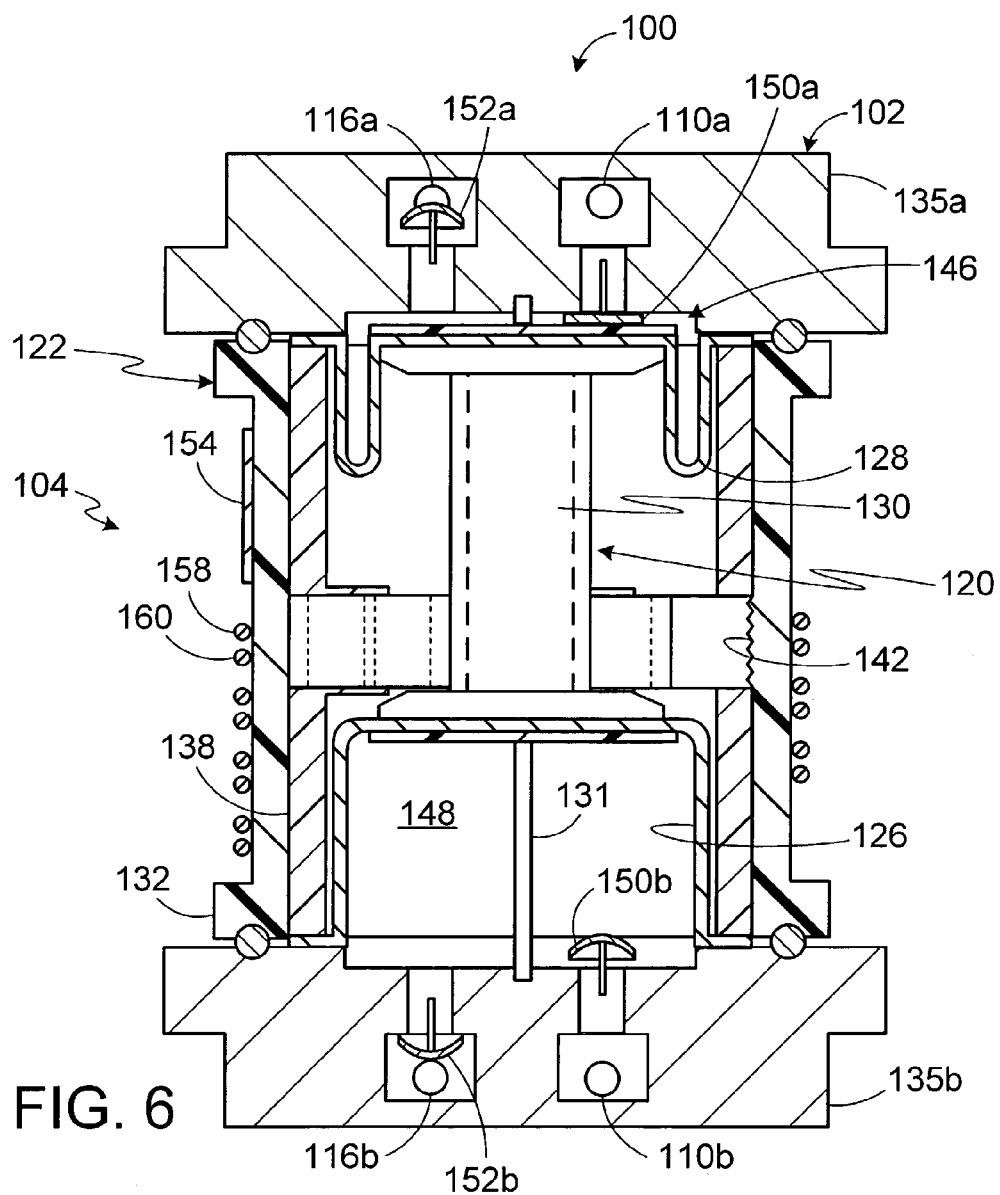
FIG. 6 is a section view taken along line 4—4 in FIG. 1 with the pump in an up-stroke orientation.

The exemplary planetary gear arrangement is configured such that a two-tenths (72 degrees) counterclockwise rotation of the rotatable structure 122 will move the linearly movable structure 120 from the position illustrated in FIG. 4 to the position illustrated in FIG. 6, i.e. a single up-stroke in the illustrated orientation. A two-tenths clockwise rotation of the rotatable structure 122 will move the linearly movable structure 120 back to the position illustrated in FIG. 4, i.e. a single down-stroke.

The rolling diaphragms 126 and 128 respectively define fluid chambers 146 and 148 that are sealed but for their connection to the inlet and outlet manifolds 106 and 108. In the exemplary pump 100, the rolling diaphragms 126 and 128 are each provided with lips 127 (FIG. 5) that are sealed against the frame upper and lower portions 135a and 135b by the gear frame 138 in a gasket-like arrangement. The axle 131 may also be coated with sealing grease if necessary. Fluid is alternately drawn into, and expelled from, the fluid chambers 146 and 148 by way of the inlet manifold 106 and the outlet manifold 108. As such, continuously repeating the up-stroke/down-stroke cycle produces continuous fluid flow to and from the pump by way of the inlet port 114 and outlet port 118. Although the present inventions are not limited to any particular valve arrangement for the fluid chambers 146 and 148, the exemplary pump 100 includes a plurality of one-way valves. The exemplary one-way valve arrangement results in fluid being expelled from the fluid chamber 146 and drawn into the chamber 148 during the up-stroke, and in fluid being drawn into chamber 146 and expelled from the chamber 148 during the down-stroke.

More specifically, and as illustrated in FIGS. 4 and 6, a pair of oppositely oriented umbrella valves 150a and 152a are respectively positioned between the fluid chamber 146 and the inlet and out manifold top portions 110a and 116a, and a pair of oppositely oriented umbrella valves 150b and 152b are respectively positioned between the fluid chamber 148 and the inlet and out manifold bottom portions 110b and 116b. Valves 150a and 152b will open, and valves 150b and 152a will close, as the linearly movable structure 120 moves from the up-stroke position illustrated in FIG. 6 to the down-stroke position illustrated in FIG. 4. This allows fluid to enter the fluid chamber 146 by way of the inlet manifold top portion 110a, while preventing fluid in the outlet manifold top portion 116a from entering the fluid chamber 146. This also allows fluid to be driven from the fluid chamber 148 to the outlet manifold bottom portion 116b, while preventing fluid in the fluid chamber 148 from being driven into the inlet manifold bottom portion 110b. Conversely, and referring to FIG. 6, valves 150b and 152a will open, and valves 150a and 152b will close, as the linearly movable structure 120 moves from the down-stroke position illustrated in FIG. 4 to the up-stroke position illustrated in FIG. 6. This allows fluid to enter the fluid chamber 148 by way of the inlet manifold bottom portion 110b, while preventing fluid in the outlet manifold bottom portion 116b from entering the fluid chamber 148, and also allows fluid to be driven from the fluid chamber 146 to the outlet manifold top portion 116a, while preventing fluid in the fluid chamber 146 from being driven into the inlet manifold top portion 110a.

The exemplary actuator 124, which drives the linearly movable structure 120 from the down-stroke orientation illustrated in FIG. 4 to the up-stroke orientation illustrated in FIG. 6 and back during each fluid driving cycle, consists of a passive device and an active device. In the exemplary pump 100 illustrated in FIGS. 1–6, the passive and active devices both act on the rotatable structure 122, which in turn acts on the linearly movable structure 120. The passive device in the exemplary implementation is a constant force spring 154 that is secured to the frame 102 and the drive hub 132. More specifically, and as illustrated in FIGS. 1–3, the spring 154 secured to a post 155 that is carried within an opening 157 in the frame 102. One end of the spring is secured to the post 155. Alternatively, the spring 154 may simply be located around the post 155, without being attached, and allowed to rotate relative to the post. The spring 154 then wraps around the post 155 a number of times, extends to and covers a portion of the drive hub 132, and is connected to drive hub by an anchor 159. The spring 154 applies force in the clockwise direction to the rotatable structure 122 and biases the linearly movable structure 120 to the down-stroke position illustrated in FIG. 4.

The active device in exemplary implementation is a shape memory actuator system 156 (FIG. 1). When energized, the shape memory actuator system 156 will rotate the rotatable structure 122 in the counterclockwise direction with enough force to overcome the biasing force of the spring 154, and drive the linearly movable structure 120 to the up-stroke position illustrated in FIG. 6. When de-energized, the shape memory actuator system 156 allows the spring 154 to rotate the rotatable structure 122 and return the linearly movable structure 120 to the down-stroke position illustrated in FIG. 4.

The exemplary shape memory actuator system 156 illustrated in FIG. 1 includes a pair of wires 158 and 160 that are wrapped tightly around the drive hub 132. One end of each wire 158 and 160 is connected to the exterior of the drive hub 132 with an anchor 162. The wires 158 and 160 are also connected to one another at the anchor 162. Alternatively, the wires 158 and 160 may be formed from a single length of wire that is bent in half at the anchor 162. The other ends of the wires 158 and 160 are connected to a voltage source 164 that applies a voltage across the wires when the shape memory actuator 156 is energized. The applied voltage results in current passing through the wires 158 and 160 and resistive heating of the wires. A portion of each wire 158 and 160 is also secured to an anchor 166 within the frame 102.

The wires 158 and 160 are preferably formed from nickel titanium (commercially available under the trade name Nitinol®) or other suitable shape memory alloys ("SMAs"). SMAs have two stable phases—the low temperature martensite (or "superplastic") phase and the high temperature austenite (or "strain recovery") phase. SMAs are capable of recovering strains, even under load, when the material is heated and transformed from the low temperature martensite phase to the high temperature austenite phase. This is sometimes referred to as the shape memory effect ("SME"). Additionally, because the wires 158 and 160 are wrapped tightly around the drive hub 132 and are secured at two points—the drive hub anchor 162, which rotates with the drive hub, and the frame anchor 166, which is fixed—the wires are configured to stretch under the load caused by the spring 154 when they are in the martensitic phase. The wires 158 and 160 are also configured to return to their original length when they return to the austenite phase due to the SME. This characteristic allows the present shape memory actuator system 156 to use the SME to perform work in the manner described below.

It should be noted here that the drive hub 132 and wires 158 and 160 are preferably coated with a low friction material such as General Magnaplate HI-T-LUBE_B® because the wires 158 and 160 will be sliding relative to the drive hub as their length increases and decreases. It is also preferred that the drive hub 132 be electrically non-conducting and have high thermal conductivity and capacity.

Given the overall configuration of the exemplary actuator 124, the shape memory actuator system 156 is able to selectively overcome the biasing force of the spring 154 by selectively transforming the phase of the wires 158 and 160 (i.e. martensitic to austenitic, or austenitic to martensitic), thereby selectively producing or eliminating the SME. Referring to FIGS. 1, 4 and 6, prior to actuation of the pump 100, the wires 158 and 160 will be relatively cool and in their martensitic phase. The linearly movable structure 120 will be in the down-stroke orientation illustrated in FIG. 4. Pumping begins when the voltage source 164 is energized and the wires 158 and 160 are resistively heated to the point at which transformation from the martensitic phase to the austenitic phase occurs. The reduction in wire length due to the SME causes the drive hub 132 to rotate with enough torque to overcome the biasing force of the spring 154, which in turn drives the drive shaft 130 upwardly. As the up-stoke of the drive shaft 130 proceeds, fluid is driven out of the fluid chamber 146 by the diaphragm 128 and is drawn into the fluid chamber 148 by the diaphragm 126. The voltage source 164 is de-energized when the linearly movable structure 120 reaches the end of the up-stroke, thereby ending the resistive heating of the wires 158 and 160 (FIG. 6). The wires 158 and 160 will then give up heat to the drive hub 132 and ambient air and return to the relatively cool, martensitic phase. In order to insure that this happens quickly, it is preferable that the wires 158 and 160 only be heated to just above their transition temperature. The wires 158 and 160 will then stretch back to their pre-actuation length as the spring 154 rotates the drive hub 132, which in turn drives the drive shaft 130 downwardly. As the down-stoke of the drive shaft 130 proceeds, fluid is driven out of the fluid chamber 148 by the diaphragm 126 and is drawn into the fluid chamber 146 by the diaphragm 128. At the end of the down-stroke, which is also the end of the pumping cycle, the voltage source 164 may be re-energized if additional pumping is required.

Pumps in accordance with the present inventions are not limited to any particular size or application. Nevertheless, and for illustrative purposes only, one exemplary implementation of the pump 100 that is well suited for certain fuel cell applications has the following physical attributes. The outer diameter of the drive hub 132 is 1.0 inch, the outer diameter of the rolling diaphragms 126 and 128 is 0.75 inch, and the drive shaft 130 stroke is 0.55 inch. The swept volume per complete cycle in 0.486 in.$^3$. With respect to the gears, the outer diameter of the drive shaft 130 (or "sun gear") is 0.35 inch, the outer diameter of the planetary gears 136 is 0.262 inch and the diameter of the drive hub gear surface 142 (or "ring gear") is 0.875 inch. The planetary gear system drive ratio—sun gear to ring gear—is 2.5. All of the gears have 45° helical cut, which creates the axial movement of the rotationally fixed drive shaft 130 in response to the rotation of the planetary gears 136.

Turning to the actuator 124, the constant force from the spring 154 on the drive hub 132 is 27 lbf., which produces 13.5 in.-lbf. of torque on the drive hub. The wires 158 and 160, which are each wrapped around the drive hub 132 four times and which will produce the 72 degree counterclockwise rotation when heated above the transition temperature, have a diameter of 0.02 inch. The diameter may be varied depending on the required pumping force. The wires 158 and 160 are also formed from Nitinol® SMA that has the following properties: SMA transition temperature of 60° C., 5% strain recovery, 15 ksi low temperature tensile strength, 50 ksi of restorative stress, 6.45 gm/cc density, a heat capacity of 0.077 cal/gm° C. and a low temperature resistivity of 76 μΩ/cm. Through the use of low friction coatings, the coefficient of friction between the drive hub 132 and the wires 158 and 160 is 0.03 which, due to friction losses, results in a minimum of 37% restorative force remaining in the wires 158 and 160 at the end of the fourth turn around the drive hub 132.

The above described implementation of the exemplary pump 100 will produce a pump pressure of 0.29 psi at a minimum and a cycle time of 320 milliseconds, which corresponds to a pump rate of about 1.52 in.$^3$/sec. and a static pressure efficiency of about 0.17%.

Another exemplary pump in accordance a present invention is generally represented by reference numeral 200 in FIGS. 7–10. Pump 200 is similar to pump 100 is many respects and similar elements are represented by similar reference numerals. The exemplary pump 200 includes a frame 202 and a fluid drive assembly 204. The fluid drive assembly 204 receives fluid (i.e. liquid or gas) by way of an inlet manifold 206 in the frame 202 and expels fluid through an outlet manifold 208 which is also located within the frame. The exemplary fluid drive assembly 204 receives fluid at both of its longitudinal ends, expels fluid at both of its longitudinal ends and, more specifically, receives fluid at one longitudinal end while expelling fluid from the other. To that end, the inlet manifold 206 includes top and bottom portions 210a and 210b and a connector portion 212. An inlet port 214 is connected to the inlet manifold 206. The outlet manifold 208, which includes top and bottom portions 216a and 216b (FIG. 9) and a connector portion (not shown), is connected to an outlet port 218.

Figure 9:
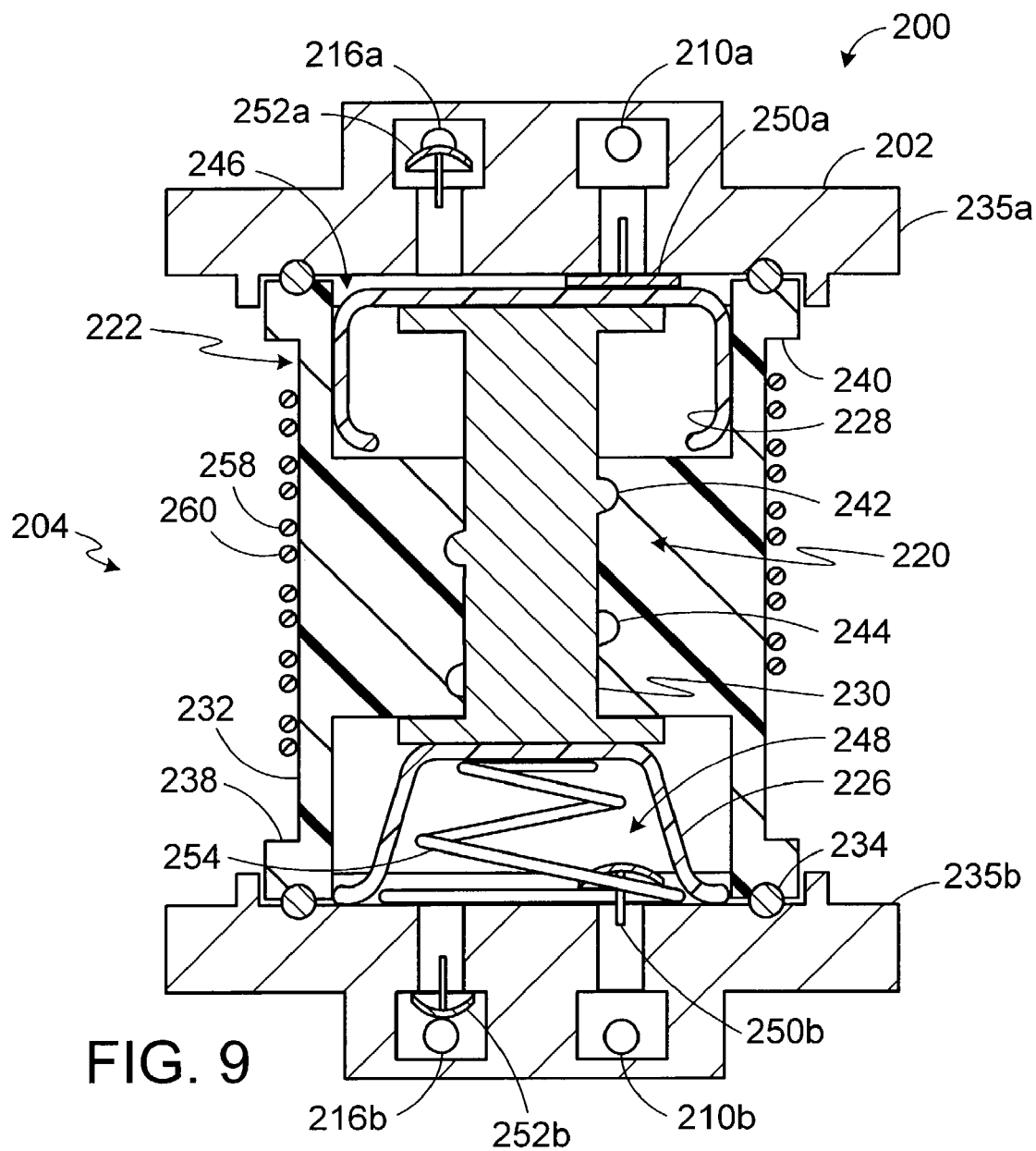
FIG. 9 is a section view taken along line 9—9 in FIG. 7 with the pump in a up-stroke orientation.

Turning to FIG. 9, the fluid drive assembly 204 in the exemplary embodiment includes a linearly (or "axially") movable structure 220 that imparts motion to fluid, a rotatable structure 222, and an actuator 224 (FIG. 7) that is associated with the linearly movable structure and rotatable structure. The exemplary linearly movable structure 220 has a pair of diaphragms 226 and 228 mounted on opposing ends of a drive shaft 230. The diaphragms 226 and 228 are formed from a flexible material such as neoprene and will deflect between orientations illustrated in FIGS. 9 and 10 as the drive shaft 230 moves linearly. The exemplary rotatable structure 222 includes a drive hub 232, which is carried by an upper and lower series of bearings 234 between the upper and lower portions 235a and 235b of the frame 202. This arrangement allows the drive hub 232 to rotate relative to the frame 202, but does not allow the drive hub to move axially. The exemplary bearings 234 are preferably ball bearings and are located within semi-circular channels that are formed in the frame upper and lower portions 235a and 235b and the drive hub 232.

The linearly movable structure 220 and rotatable structure 222 may be connected to one another in any suitable manner that results in linear movement of the drive shaft 230 in response to rotation of the drive hub 232 as well as rotation of the drive hub in response to linear movement of the drive shaft. In the exemplary embodiment, the connection is mechanical and consists of a helical thread 242 on the drive shaft 230 and a corresponding helical slot 244 in the drive hub 232. The arrangement of the thread 242 and slot 244 may also be reversed so that the thread is on the drive hub 232 and the slot is on the drive shaft 230. The exemplary thread and slot arrangement is configured such that a single clockwise rotation of the rotatable structure 222 will move the linearly movable structure 220 from the position illustrated in FIG. 9 to the position illustrated in FIG. 10, i.e. a single down-stroke in the illustrated orientation. A single counter clockwise rotation of the rotatable structure 222 will occur when the linearly movable structure 220 moves back to the position illustrated in FIG. 9, i.e. a single up-stroke.

Figure 10:
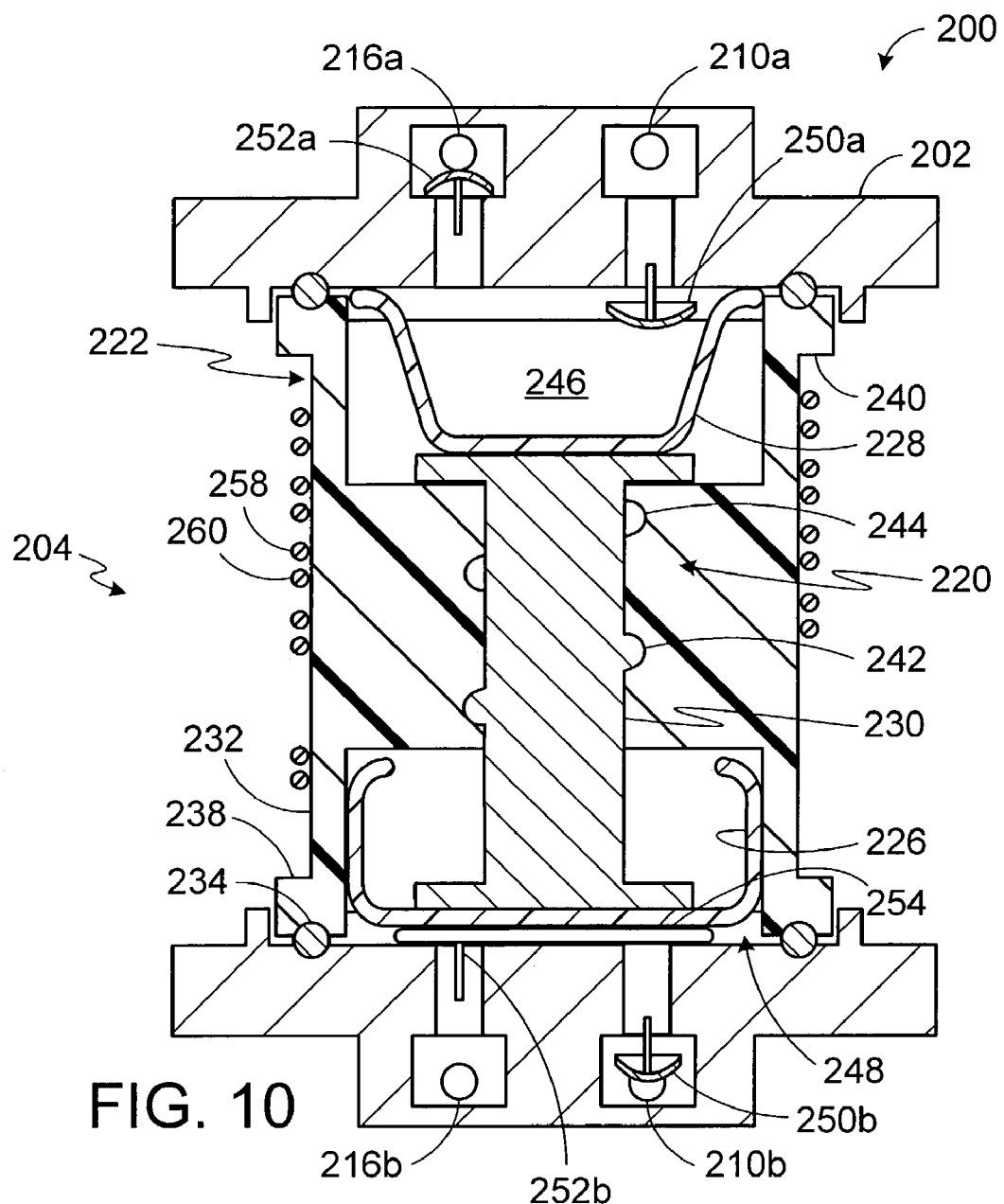
FIG. 10 is a section view taken along line 9—9 in FIG. 7 with the pump in a down-stroke orientation.

The diaphragms 226 and 228 define respectively fluid chambers 246 and 248 that are sealed but for their connection to the inlet and outlet manifolds 206 and 208. Gaskets (not shown) may be provided between the frame 202 and drive hub 232 if necessary to maintain the seal. Fluid is alternately drawn into and expelled from, the fluid chambers 246 and 248 by way of the inlet manifold 206 and the outlet manifold 208. As such, continuously repeating the up-stroke/down-stroke cycle produces continuous fluid flow to and from the pump by way of the inlet port 214 and outlet port 218. Although the present inventions are not limited to any particular valve arrangement for the fluid chambers 246 and 248, the exemplary pump 200 includes a valve arrangement similar to that described above with reference to the exemplary pump 100. More specifically, and as illustrated in FIGS. 9 and 10, a pair of oppositely oriented umbrella valves 250a and 252a are respectively positioned between the fluid chamber 246 and the inlet and outlet manifold top portions 210a and 216a, and a pair of oppositely oriented umbrella valves 250b and 252b are respectively positioned between the fluid chamber 248 and the inlet and outlet manifold bottom portions 210b and 216b. The valves 250a/b and 252 a/b will open and close during the up and down strokes in the manner described above with reference to the exemplary pump 100.

The exemplary actuator 224, which drives the linearly movable structure 220 and rotatable structure 222 from the up-stroke orientation illustrated in FIG. 9 to the down-stroke orientation illustrated in FIG. 10 and back during each fluid driving cycle, consists of a passive device and an active device. The passive device preferably acts on the linearly movable structure 220, while the active device preferably acts on the rotatable structure 222. The passive device in the exemplary implementation is a spring 254 positioned under the diaphragm 226. The spring 254 applies force in the axial direction to the movable structure 220 and biases the linearly movable structure to the up-stroke position illustrated in FIG. 9. Alternatively, a torque inducing spring which rotates the drive hub 232 in the counterclockwise direction may be provided in place of, or in addition to, the spring 254.

Figure 7:
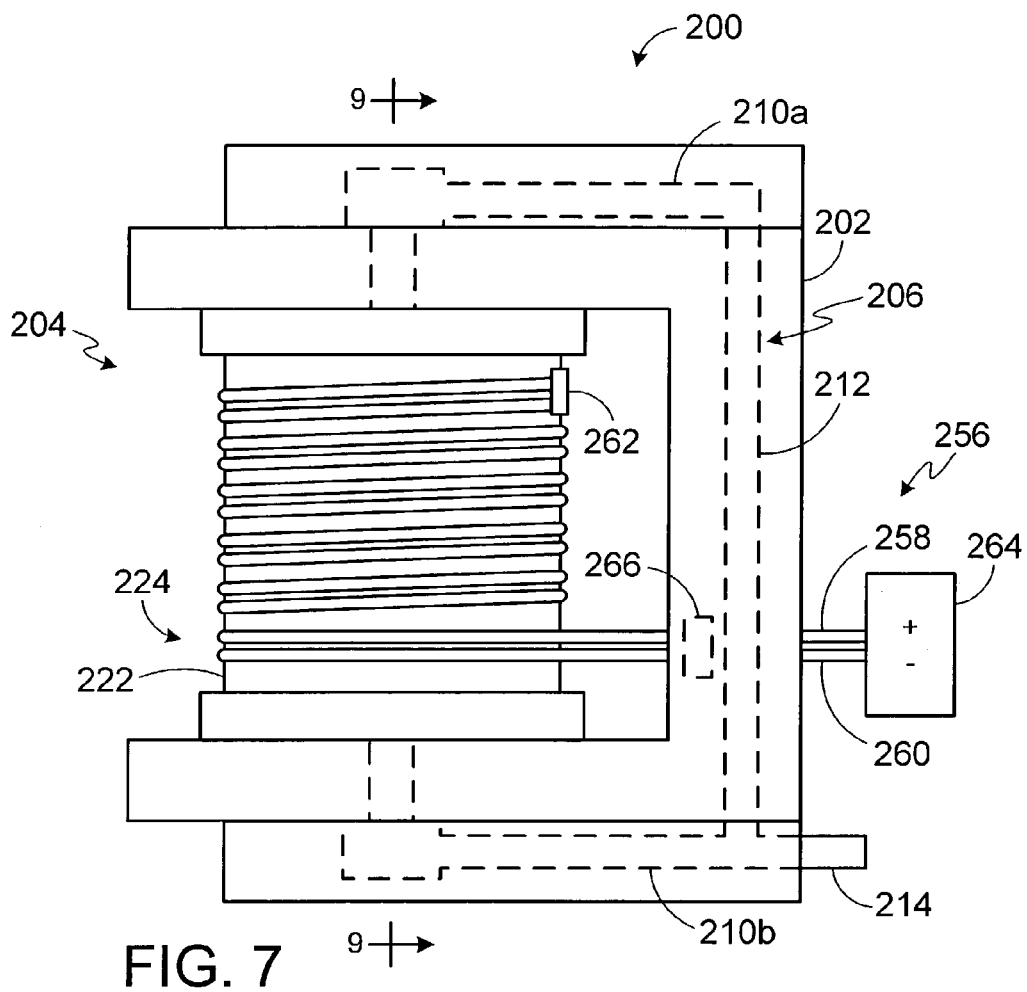
FIG. 7 is a side view of a pump in accordance with a preferred embodiment of a present invention.
Figure 8:
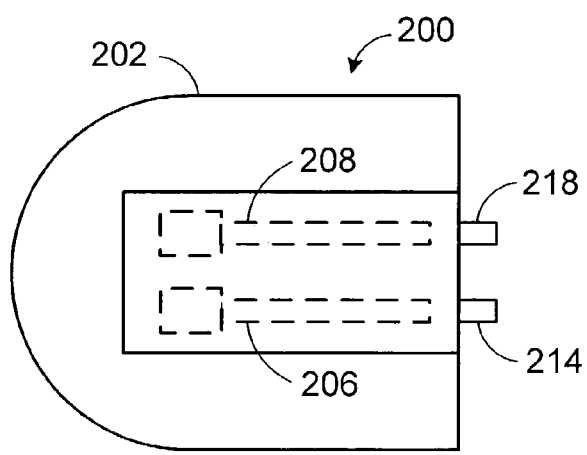
FIG. 8 is a top view of the pump illustrated in FIG. 7.

The active device in exemplary implementation is a shape memory actuator system 256 (FIG. 7). When energized, the shape memory actuator system 256 will rotate the drive hub 232 in the clockwise direction with enough force to overcome the biasing force of the spring 254, and drive the movable structure 220 to the down-stroke position illustrated in FIG. 10. When de-energized, the shape memory actuator system 256 allows the spring 254 to return the linearly movable structure 220 to the up-stroke position illustrated in FIG. 9. The exemplary shape memory actuator system 256 operates in substantially the same manner as the system 156 described above. Briefly, the shape memory actuator system 256 includes a pair of SMA wires 258 and 260 that are wrapped tightly around the drive hub 232 and are connected to the drive hub with anchor 262. The wires 258 and 260 are also connected to one another at the anchor 262, or may be formed from a single length of wire that is bent in half at the anchor. The other ends of the wires 258 and 260 are connected to a voltage source 264 that applies a voltage across the wires when the shape memory actuator 256 is energized. A portion of each wire 258 and 260 is also secured to an anchor 266 within the frame 202.

Given the overall configuration of the exemplary actuator 224, the shape memory actuator system 256 is able to selectively overcome the biasing force of the spring 254 by selectively transforming the phase of the wires 258 and 260 (i.e. martensitic to austenitic, or austenitic to martensitic), thereby selectively producing or eliminating the SME. Prior to actuation of the pump 200, the wires 258 and 260 will be relatively cool and in their martensitic phase and the linearly movable structure 220 will be in the up-stroke orientation illustrated in FIG. 9. When the voltage source 264 is energized and the wires 258 and 260 are resistively heated to their transformation temperature, the SME will reduce the length of the wires and cause the drive hub 232 to rotate with enough torque to overcome the biasing force of the spring 254, thereby driving the drive shaft 230 downwardly. The voltage source 264 is de-energized when the linearly movable structure 220 reaches the end of the down-stroke (FIG. 10) in order to allow the wires 258 and 260 to return to their relatively cool, martensitic phase. The wires 258 and 260 will then stretch back to their pre-actuation length as the spring 254 drives the drive shaft 230 upwardly, and the drive hub 232 rotates, until the drive shaft reaches the up-stroke orientation.

Figure 11:
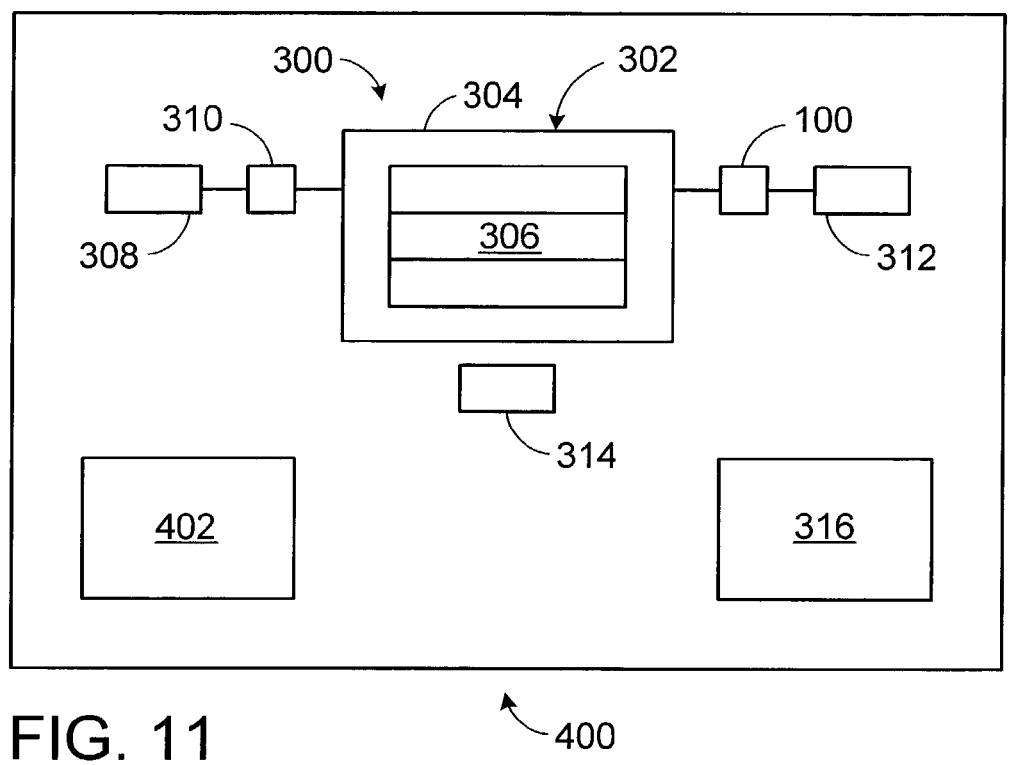
FIG. 11 is a diagrammatic view of a system in accordance with a preferred embodiment of a present invention.

The exemplary pumps 100 and 200 illustrated in FIGS. 1–10 have a wide variety of applications. By way of example, but not limitation, the pumps may form part of the fuel cell system 300 illustrated in FIG. 11. In addition to the exemplary pump 100, the fuel cell system 300 includes a fuel cell stack 302 in a housing 304 with fuel and oxygen manifolds (not shown). The individual fuel cells 306 in the stack may be any suitable type of cells including, but not limited to, PEM fuel cells. Fuel from a fuel source 308 is supplied to the anodes of the fuel cells 306 by way of a pump 310 and the fuel manifold. It should be noted that the present fuel cell systems include those in which the fuel source 308 is replenishable (or replaceable) as well as those in which all of the fuel that will be consumed is initially present in the fuel source. Oxygen from an oxygen source, such as the ambient air vent 312, is supplied to the cathodes of the fuel cells 306 by way of the pump 100 and the oxygen manifold. Current collectors (not shown) may be formed on or within each anode and cathode. The anode contact pads of adjacent fuel cells 306 may be connected to one another in series, as may the cathode contact pads. The actual connection scheme will, however, depend on the power requirements of the load. Byproducts and unused reactants, if any, exit the housing by way of a vent 314.

A controller 316 may be provided to monitor and control the operations of the exemplary fuel cell system 300. The operation of the fuel cell system 300 may, alternatively, be controlled by the host (i.e. power consuming) device which, in the illustrated embodiment, is a mobile computer 400 with a power consuming hardware set 402 including, but not limited to, a CPU, disk drives, and a display.

Although the present inventions have been described in terms of the preferred embodiments above, numerous modifications and/or additions to the above-described preferred embodiments would be readily apparent to one skilled in the art. By way of example, but not limitation, the present inventions are not limited to pumps with two diaphragms. The diaphragms could be replaced by pistons. A single diaphragm (or piston) pump that expels fluid on one of the strokes and draws fluid on the other could be provided to provide fluid pulses. The present inventions are also not limited to the exemplary frame and manifold arrangement. The frame may be reconfigured to suit particular applications such as, for example, those in which environmental considerations require the fluid drive assembly to be enclosed, as may the manifold. Additionally, by using separate inlet and outlet manifolding for each of the diaphragms, two different fluids may be pumped by the same pump with swept volumes for each as dictated by the diaphragm size selected. It is intended that the scope of the present inventions extend to all such modifications and/or additions.

We claim:

1. A pump, comprising:
   first and second movable structures configured to move axially along an axis and to impart motion to a fluid;
   a hub operably connected to the first and second movable structures such that rotation of the hub about the axis results in movement of the first and second movable structures, the hub being rotatable in a first direction and a second direction and substantially surrounding the first and second movable structures;
   a biasing device, operably connected to the rotatable hub, that applies a biasing force in the first direction to the hub; and shape memory material, operably connected to the rotatable hub, that is configured to stretch in the first direction under the biasing force when in a martensite phase, and to recover strain and rotate the hub in the second direction when in an austenite phase.

2. A pump as claimed in claim 1, wherein the first and second movable structures comprise first and second diaphragms.

3. A pump as claimed in claim 1, wherein the first direction is clockwise.

4. A pump as claimed in claim 1, wherein the biasing device comprises a spring.

5. A pump as claimed in claim 1, further comprising:
a linearly movable structure that operably connects the biasing device to the rotatable hub.

6. A pump, comprising:
first and second fluid chambers having respective inlets and outlets;
a movable apparatus configured to move axially along an axis and to impart motion to fluid in the first and second fluid chambers when moving;
a hub operably connected to the movable apparatus such that rotation of the hub about the axis results in movement of the movable apparatus, the hub being located between the first fluid chamber inlet and the second fluid chamber inlet and rotatable in a first direction and a second direction;
means for applying a constant biasing force in the first direction to the hub; and
means for selectively overcoming the constant biasing force to rotate the hub in the second direction.

7. A pump as claimed in claim 6, wherein the movable apparatus comprises first and second diaphragms and a linearly movable shaft.

8. A pump as claimed in claim 6, wherein the first direction is clockwise.

9. A pump as claimed in claim 6, wherein the movable apparatus includes a linearly movable structure that operably connects the hub to the means for applying a constant biasing force in the first direction to the hub.

10. A pump, comprising:
a movable structure configured to impart motion to a fluid;
a linearly movable shaft operably connected to the movable structure;
a rotatable hub operably connected to the linearly movable shaft such that rotation of the rotatable hub moves the linearly movable shaft linearly;
a shape memory actuator that rotates the hub in a first direction when actuated; and
a bias element, located within the movable structure, that biases the hub in a second direction.

11. A pump as claimed in claim 10, wherein the movable structure comprises a diaphragm.

12. A pump as claimed in claim 10, wherein the bias element comprises a spring.

13. A pump as claimed in claim 10, wherein the linearly movable shaft and rotatable hub are connected by a planetary gear arrangement.

14. A pump as claimed in claim 10, wherein the linearly movable shaft and rotatable hub are connected by a thread and slot arrangement.

15. A pump as claimed in claim 10, wherein the shape memory actuator includes a wire formed from shape memory material wrapped around the rotatable hub.

* * * * *